United States Patent [19]

Hersom et al.

[11] Patent Number: 4,479,758
[45] Date of Patent: * Oct. 30, 1984

[54] PISTON FILLER

[75] Inventors: Albert C. Hersom, Beaconsfield; Kenneth W. Wright, Twyford, both of England

[73] Assignee: Societe d'Assistance Technique Pour Produits Nestle S.A., Lausanne, Switzerland

[*] Notice: The portion of the term of this patent subsequent to Oct. 25, 1990 has been disclaimed.

[21] Appl. No.: 324,792

[22] Filed: Nov. 25, 1981

Related U.S. Application Data

[63] Continuation-in-part of Ser. No. 100,823, Dec. 6, 1979, abandoned, and a continuation-in-part of Ser. No. 236,173, Feb. 20, 1981, Pat. No. 4,411,601.

[51] Int. Cl.³ ..................... F04B 15/02; F04B 21/02
[52] U.S. Cl. ..................... 417/388; 417/509; 417/518; 222/129.2; 222/135; 222/145
[58] Field of Search ............ 417/383, 386, 387, 388, 417/508, 509, 510, 518; 222/135, 145, 129.2; 366/136, 137

[56] References Cited

U.S. PATENT DOCUMENTS

| 2,566,436 | 9/1951 | Waite | 222/129.2 X |
|---|---|---|---|
| 2,585,172 | 2/1952 | Reynolds | 222/129.2 X |
| 2,807,215 | 9/1957 | Hawxhurst | 417/388 |
| 3,207,384 | 9/1965 | Wall | 222/145 X |
| 3,228,560 | 1/1966 | Tacchi | 417/377 X |
| 3,254,845 | 6/1966 | Schlosser | 417/388 X |
| 3,930,756 | 1/1976 | Bruggeman | 417/383 |
| 4,047,850 | 9/1977 | Berthelot | 417/383 |
| 4,192,361 | 3/1980 | Moser | 417/518 X |
| 4,332,335 | 6/1982 | Fiorentini | 222/145 |
| 4,411,601 | 10/1983 | Hersom et al. | 417/388 |

FOREIGN PATENT DOCUMENTS

| 946768 | 8/1956 | Fed. Rep. of Germany | 417/510 |
|---|---|---|---|
| 2227772 | 11/1974 | France | 417/518 |

*Primary Examiner*—Leonard E. Smith
*Attorney, Agent, or Firm*—Vogt & O'Donnell

[57] ABSTRACT

A piston filler for metering two fluids intermittently comprising a cylinder having a first and a second inlet conduit and an outlet conduit, means for closing the communication between the cylinder and the first inlet conduit and between the cylinder and the outlet conduit alternately, there being present inside the cylinder a first piston for drawing in a primary fluid from the first inlet conduit and discharging it into the outlet conduit and a second piston for drawing in a secondary fluid from the second inlet conduit which piston has at least one port provided with one or more valves through which the secondary fluid can flow to occupy the space between the two pistons where it can transmit the motion of the second piston to the first piston, and means for conveying secondary fluid from the space between the pistons to the outlet conduit.

13 Claims, 12 Drawing Figures

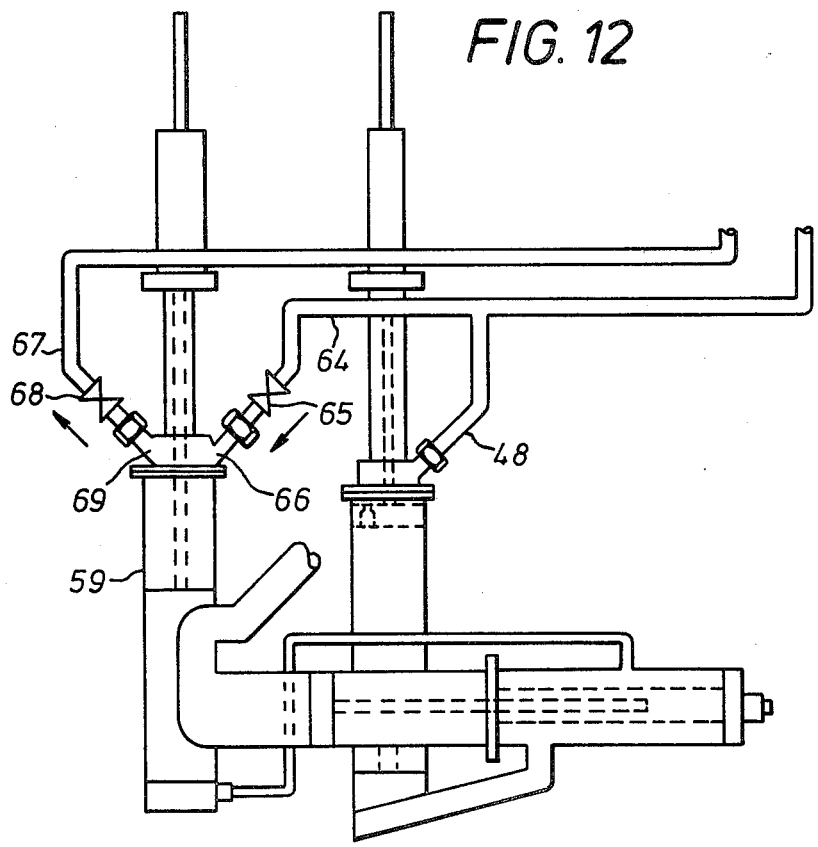

PISTON FILLER

This application is a continuation-in-part of application Ser. No. 100,823, filed Dec. 6, 1979, now abandoned, and this application is also a continuation-in-part of application Ser. No. 236,173, filed Feb. 20, 1981, now U.S. Pat. No. 4,411,601.

The present invention relates to a piston filler, more particularly to a piston filler intended for metering two distinct fluids sequentially in one filling cycle.

In piston fillers, air is normally present behind the piston and this air usually contains small particles as impurities. In an aseptic process such as, for example, the metering of a food product, leakage of the product often occurs around the piston and this product can become infected by microorganisms which can gain access from air behind the piston. This air normally has to be vented to the atmosphere in order to avoid pressurisation during each backward stroke of the piston. It is usually maintained sterile by elaborate means such as the provision of air filters. Furthermore, after discharge some product is often left adhering to the walls of the outlet and to the front end of the piston which not only presents a further risk of infection but also causes inaccuracies in metering.

We have now devised a piston filler which is suitable for metering intermittently two distinct sterile fluids, such as would be required in a food or pharmaceutical process under aseptic conditions, which eliminates the need for air filters and which overcomes the problem where residual product is left adhering to the walls of the outlet. For example, one fluid may be a relatively thick fluid or a suspension of solid particles in a liquid and the other fluid may be a liquid, such as water.

Accordingly, the present invention provides a piston filler for metering two fluids intermittently comprising a cylinder having a first and a second inlet conduit and an outlet conduit, means for closing the communication between the cylinder and the first inlet conduit and between the cylinder and the outlet conduit alternately, there being present inside the cylinder a first piston for drawing in a primary fluid from the first inlet conduit and discharging it into the outlet conduit and a second piston for drawing in a secondary fluid from the second inlet conduit which piston has at least one port provided with one or more valves through which the secondary fluid can flow to occupy the space between the two pistons where it can transmit the motion of the second piston to the first piston, and means for conveying secondary fluid from the space between the pistons to the outlet conduit.

The valve or valves on the second piston are preferably non-return valves which are adapted to close when the second piston moves towards the first piston thus creating a hydraulic pressure in the secondary fluid between the pistons, which causes the first piston to move towards a forward stop position to discharge the primary fluid.

The means for closing the communication between the cylinder and either the first inlet conduit or the outlet conduit is conveniently provided by a distributor valve which may be rotatable. However, the distributor valve is advantageously a sliding shuttle valve which conveniently has a port by way of which the primary fluid may flow into the cylinder from the first inlet conduit. The shuttle valve may be provided with integral guide rods and fitted with gaskets to prevent leakages which are particularly undesirable in an aseptic process. Preferably, the shuttle valve is adapted to wipe the front face of the first piston located at its forward stop position as it slides to close the communication between the cylinder and the outlet conduit and such an arrangement overcomes the problem encountered in conventional piston fillers where residual product is left adhering to the front end of the piston after discharge. Advantageously, the shape of the front face of the first piston is correlated with the shape of the wiping surface of the shuttle valve and in an especially preferred embodiment, the wiping surface of the shuttle valve is semi-cylindrical while the first piston has a complementary concave front face with a radius corresponding to that of the wiping surface of the shuttle valve and is positioned to reciprocate in the cylinder in such a way that when it is at its forward stop position, the convex semi-cylindrical wiping surface of the shuttle valve wipes its concave front face as the shuttle valve slides to close the communication between the cylinder and the outlet conduit.

The first piston, which is advantageously a floating piston, may be provided with guide means to prevent it rotating as it slides in the cylinder, especially when the shape of the front face of the first piston is correlated with the shape of the wiping surface of the shuttle valve. Both the pistons may be provided with integral guide rods and both the pistons and the guide rods may beneficially be fitted with gaskets to prevent leakages. The cylinder may be provided with stops to limit the stroke of the first piston and these are preferably adjustable so that the ratio of the two fluids may be varied if desired. Both the second piston and the means for closing the communication between the cylinder and the first inlet conduit and between the cylinder and the outlet conduit may be actuated mechanically be cam systems, by which means their movements may be synchronised. Each cam system may take the form of a rail on a rotary filler.

Both fluids may be held in reservoirs under slight positive pressure which may be adjusted to assist the dynamics of the filling action.

One embodiment of the invention includes means defining a cylinder bore having a forward end and a rearward end, means defining an inlet and an outlet, and cyclically operative valve means for connecting the forward end of said bore alternately to the inlet and the outlet. Means are provided for connecting said inlet to a source of primary fluid. A first piston and a second piston, each having a forward face and a rearward face, are slidably sealingly mounted in the cylinder bore, the first piston being disposed forwardly of said second piston whereby said pistons define a space therebetween. The first piston has a port extending between its faces.

Cyclically operative first piston reciprocation means are provided. Such reciprocation means are coordinated with the valve means for moving the first piston rearwardly when the valve means connects the cylinder bore with the inlet and moving the first piston forwardly when the valve means connects the bore with the outlet. Thus, the first piston will draw the primary fluid into the cylinder bore via the inlet and expel it via the outlet. Cyclically operative second piston reciprocating means are provided for reciprocating said second piston in coordination with said first piston to alternately increase and decrease the volume of the space between the pistons by a predetermined amount.

A control valve communicates with such space, there being means for supplying a secondary fluid to said control valve. The control valve is operative to permit flow of secondary fluid into the space between the pistons but block flow out of said space.

Port control means are provided for closing the port in the first piston during an increase in the volume of the space between the pistons and for opening such port during a decrease in the volume of such space, whereby a predetermined amount of the secondary fluid will be drawn into the space between the pistons through the control valve and expelled through the port in the first piston, through the forward end of the bore and into the outlet on each cycle of the valve means and reciprocation means.

A second embodiment of the invention includes means defining a first cylinder bore having a forward end and a rearward end. Further means define a cutoff bore having an upstream end, a downstream end, an outlet adjacent said downstream end and an inlet remote from said outlet, the forward end of said first cylinder bore intersecting the cutoff bore between said inlet and said outlet.

A first piston having a forward face and a rearward face is slidably sealingly mounted in the cylinder bore for movement between a forward position adjacent said cutoff bore and a rearward position remote from said cutoff bore.

A shuttle having a downstream end, an upstream end, a wiping surface between said ends, and a recess in said wiping surface is slidably sealingly mounted in the cutoff bore, the downstream end of the shuttle facing toward the downstream end the cut off bore. The shuttle is movable between an upstream position in which the downstream end of the shuttle is upstream of said first cylinder bore and a downstream position in which the downstream end of the shuttle is downstream of said first cylinder bore and the recess in the wiping surface of the shuttle extends between said inlet and said cylinder bore. The inlet of the cutoff bore may be connected to a source of a primary fluid.

Cyclically operative reciprocation means are provided. The reciprocation means retract the first piston rearwardly while retaining said shuttle in said downstream position, whereby the primary fluid will enter the cylinder bore via the inlet and the recess in the shuttle. The reciprocation means then move the shuttle to the upstream position and advance the piston to its forward position while retaining the shuttle in the upstream position. Thus, the first piston expels the primary fluid from the cylinder bore into the cutoff bore downstream of the shuttle. The reciprocation means then move the shuttle to its downstream position while retaining the piston in its forward position, whereby the shuttle expels primary fluid from the cutoff bore through the outlet and the wiping surface of the shuttle engages and wipes the forward face of the first piston.

The apparatus also includes cutoff bore wash means for supplying a secondary fluid to the cutoff bore upstream of said shuttle, cylinder bore wash means for passing secondary fulid into and out of said first cylinder bore rearwardly of said first piston, and outlet wash means for introducing secondary fluid into the cutoff bore downstream of said shuttle while said shuttle is adjacent said downstream position. Thus, the secondary fluid contacts the downstream end of the shuttle to thereby wash any residual primary fluid from the downstream portion of said cutoff bore and the downstream end of the shuttle.

In a food process the primary fluid may be a sterile suspension containing large food particles such as a soup or a stew and the secondary fluid may be a sterile fluid such as sterile water. The secondary fluid which is sterile, may be present behind the means for closing the communication between the cylinder and either the first inlet conduit or the outlet conduit by a connection from the secondary fluid reservoir.

It is possible to carry out in-place cleaning of the piston filler of the present invention without extensive dismantling, and pre-sterilisation can be performed with either steam or pressurised water at about 130° C.

The present invention will now be further described by way of example with reference to the accompanying drawings in which:

FIG. 11 is a perspective view of the shuttle valve and the floating piston to illustrate their correlating shapes and FIG. 12 is a diagrammatic view of a pump to show an alternative means of transport of the secondary fluid.

Figure 1:
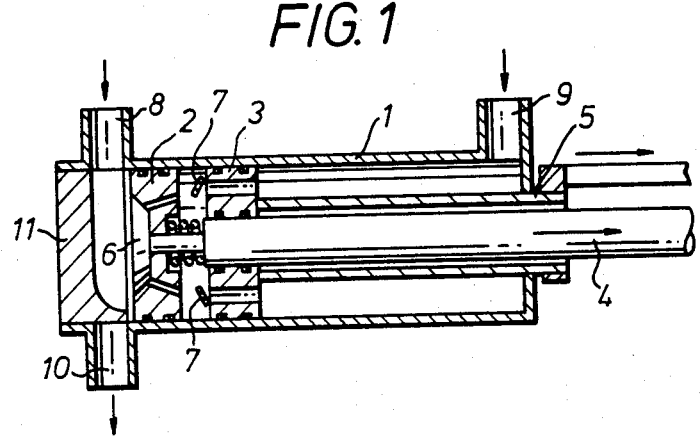
FIG. 1 is a diagrammatic section of an embodiment showing the components in the starting position of the cycle.

In the drawings, the piston filler comprises a cylinder 1 defining a cylinder bore having a forward end and a rearward end. A first piston 2 and a second piston 3 are mounted in the cylinder bore for reciprocation, first piston 2 being disposed forwardly of second piston 3 so that the pistons define a space between them. Piston 2 is mounted on a piston-rod 4, and piston 3 is mounted on a tube 5 coaxial with the piston rod 4. Piston-rod 4 and tube 5 are actuated independently by means not represented (for example by air cylinders). In another embodiment, they are actuated and synchronised by cams. Adjustable stops limit the piston stroke.

Piston 2 is provided with a central port extending between its forward and rearward faces. The port is normally held closed by a port control valve 6 by means of the tension on a spring coaxial with piston-rod 4. In another embodiment, piston 2 is mounted on piston-rod 4 and the valve 6 is actuated by independent means.

Piston 3 comprises several ports having control valves 7 which enable a liquid to flow only from right to left in the drawing i.e., into the space between pistons 2 and 3.

Figure 2:
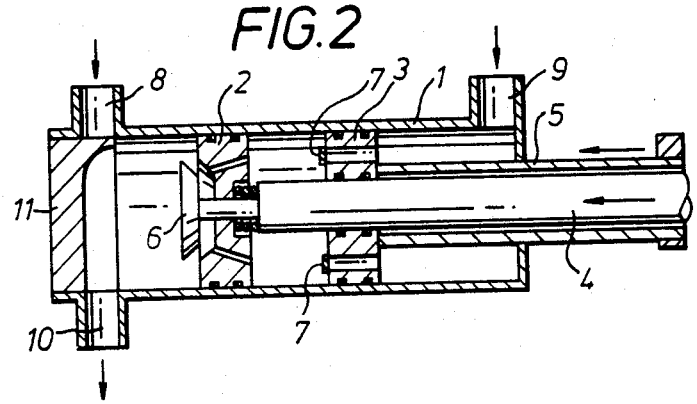
FIG. 2 is the same section as in FIG. 1 but showing operation of the components during the cycle.

Cylinder 1 comprises two inlets preferably under adequate pressure, a first one 8 for a thick fluid or a suspension and a second one 9 for a liquid. The cylinder also comprises an outlet 10 through which the resulting mixture or diluate flows. In a preferred embodiment, a rotatable distributor valve 11 opens a port at the forward end of the cylinder (left on the drawing), thus enabling the cylinder to communicate either with the first inlet 8 (as shown in FIG. 1) or with the outlet 10 (as shown in FIG. 2). This distributor valve is actuated in synchronism with the movement of the pistons 2 and 3 by means not represented.

The operation of the pump is as follows.

Starting from the position shown in FIG. 1, the two pistons 2 and 3 move rearwardly (from the left to the right as seen in the drawings), piston 3 having a greater speed and a longer stroke than piston 2 so that the volume of the space between the two pistons increases during such rearward motion. During this movement, piston 2 draws in the fluid through the first inlet 8 (valve 6 being closed) whereas the liquid drawn in by the second inlet 9 passes from the right to the left of piston 3 through the control valves 7. At the end of the stroke a portion of the liquid brought in through the second inlet 9 is contained between the pistons 2 and 3 and a portion of fluid brought in through the first inlet 8 is contained between distributor valve 11 and piston 2.

Distributor valve 11 then leaves a communication between cylinder 1 and outlet 10 (FIG. 2) and the pistons move forwardly (i.e. from right to left in the drawing) thus decreasing the volume of the space between the pistons. The control valves 7 close and piston-rod 4 opens port control valve 6. In this way, the portion of liquid which was contained between the two pistons passes through piston 2 into the forward end of the bore and mixes with the fluid. At the end of the stroke, the mixture is forced through the outlet 10 in its entirety and the cycle starts again.

Figure 3:
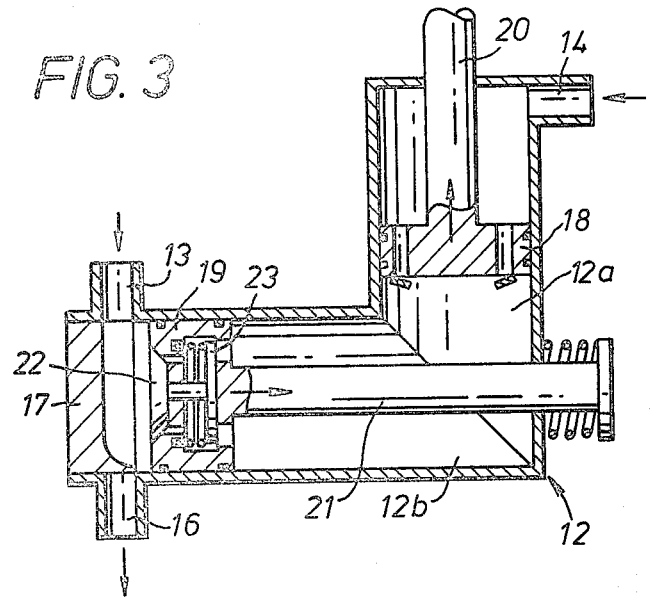
FIG. 3 is a diagrammatic section of a second embodiment showing the components at the beginning of a metering stroke.
Figure 4:
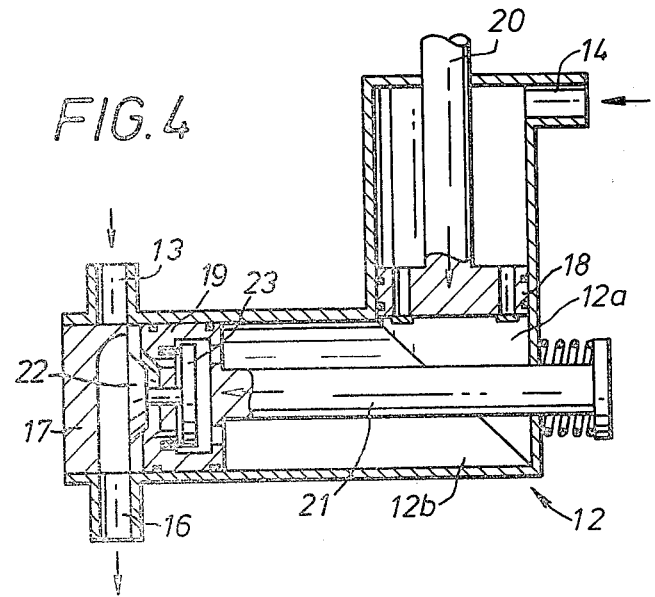
FIG. 4 is the same section as in FIG. 3 but with the components nearing the end of the mixing or dilution stroke.

In the second embodiment shown in FIGS. 3 and 4, 12a and 12b may be regarded as two parts of one cylinder 12 at right angle to each other. As in the embodiment of FIGS. 1 and 2, the piston filler comprises two inlets preferably under adequate pressure, the first, 13, for a thick fluid or a suspension and the second, 14, for a liquid. It also comprises an outlet 16 through which the resulting mixture or diluate flows, a rotatable distributor valve 17 opening a port at the forward end of the part 12b (left on the drawing), thus providing communication between the cylinder and either the inlet 13 (as shown in FIG. 3) or the outlet 16 (as shown in FIG. 4). This distributor valve is actuated in synchronism with the movements of second piston 18 reciprocating in the part 12a of the cylinder and of first piston 19 reciprocating in the part 12b of the cylinder.

The second piston 18 is mounted on a piston rod 20 and is actuated by means (not represented) such as for example an air cylinder connected to the piston rod 20. The first piston 19 is mounted on a piston rod 21 and is normally biased rearwardly, towards the right end of the part 12b of the cylinder by means of the tension of a coil spring coaxial with the piston rod 21. Stops limit the travel of the pistons.

The second piston 18 has several ports provided with non-return control valves which only enable a liquid to flow through the piston when the latter is moving upwards. The first piston 19 has a central port provided with a normally closed, pressure-actuated valve 22. This valve 22 is connected to a plate 23 located in a chamber inside the piston; the chamber communicates with the part 12b of the cylinder by ports in the right hand wall of the piston.

The operation is as follows.

Beginning with the position shown in FIG. 3, the second piston 18 moves upwards or rearwardly, its non-return valves open and the liquid which entered through the inlet 14 passes from the upper to the lower face of the piston. Due to the pressure release between the pistons 18 and 19 while the former goes up, the valve 22 closes; assisted by the coil spring, the piston 19 moves rearward from left to right, drawing the thick fluid or suspension through the inlet 13 into the cylinder. When the piston 18 has reached its upper position and the piston 19 its right hand stop, part 12a of the cylinder is full of liquid and part 12b of the cylinder is full of the thick fluid or suspension. This is the end of the metering stroke.

The distributor valve 17 is then turned in the position shown in FIG. 4, providing a communication between cylinder 12 and outlet 16. The second piston 18 moves downwards or forwardly, its nonreturn or control valves close, liquid is drawn into the cylinder through inlet 14 and piston 19 is moved to the left by the liquid between pistons 18 and 19 until it reaches its left stop. Pressure of the liquid on the plate 23 then opens the vlave 22 (FIG. 4) and the liquid passes through the central port of the piston 19 towards the outlet 16.

When the piston 18 has reached its lower stop, ending the mixture or dilution stroke, the cycle starts again.

Figure 5:
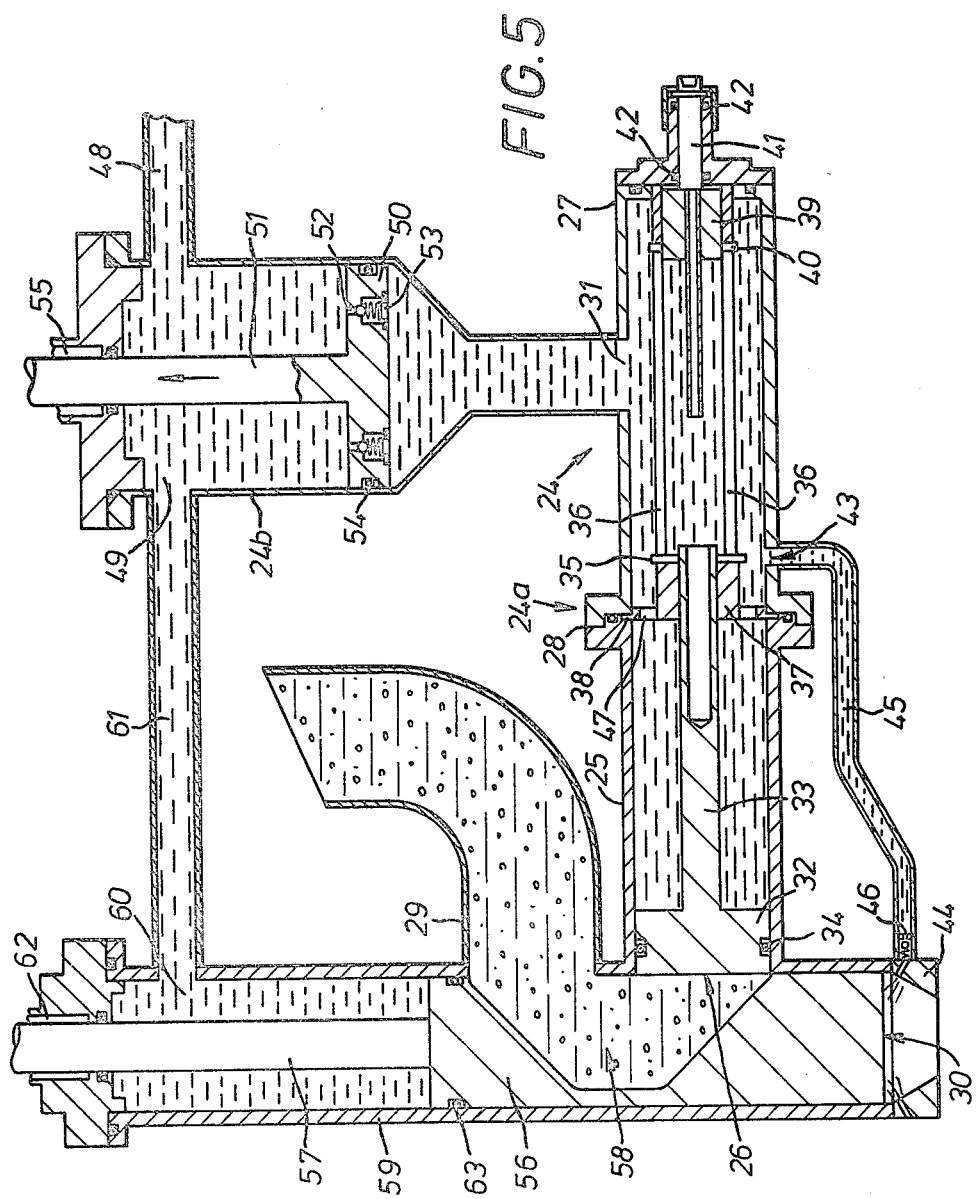
FIG. 5 is a diagrammatic section of a third embodiment showing the components at the commencement of the metering stroke.

In the third embodiment shown in FIGS. 5 to 11, the piston filler comprises a cylinder 24 arranged in two parts 24a and 24b at right angles to one another. Part 24a comprises a measuring cylinder 25 fitted with an end cap 27 by means of a flange joint 28, the cylinder 25 and cap 27 cooperatively defining a first cylinder bore. The first cylinder bore connects via port 26, at the forward end of the bore with a cutoff bore defined by cutoff cylinder 59. There is a passage 31 connecting the interior of end cap 27 and hence the interior of the first cylinder bore, with the interior of part 24b. Both the end cap and part 24b contain a secondary fluid. Both the primary fluid and the secondary fluid are held in reservoirs (not shown) under positive pressure. A floating piston 32 having an integral guide rod 33 is free to reciprocate within the cylinder 25. A seal 34 may be fitted to the piston 32 to separate the primary fluid in front of the piston from the secondary fluid at the rear of the piston. The forward position of the piston 32 and guide rod 33 is limited by a pin 35 engaging with the end of slots 36 at its forward end in a guide tube 37 which is clamped by means of a support flange 38 between the flanges of the measuring cylinder 25 and the end cap 27. The position is a permanently fixed one, i.e. fully forward with the forward face of the piston adjacent the cutoff bore in cylinder 59, as illustrated in FIG. 5. The interaction of the pin 35 with the slots 36 in the guide tube 37 also prevents the piston from rotating. The rearward position of the piston 32 is adjustable and is governed by the guide rod 33 engaging with a back-stop bush 39. The position of this bush 39 which slides within the guide tube 37 and is prevented from turning by a pin 40 which engages in the slots 36 can be adjusted axially by rotating a screw 41 which engages with the bush itself, thus enabling the volumetric displacement of the piston 32 to be pre-set. The screw 41 is actuated externally and "O" ring seals 42 are fitted to maintain a leak-free or aseptic operation. The end cap has an outlet 43 which connects with a discharge nozzle 44 by means of a tubular by-pass 45 fitted with a non-return valve 46 provided with a spring which is set to open at a predetermined pressure. The guide tube 37 has holes 47 drilled in its supports flange 38 and these holes allow the free flow of secondary fluid to the back of the piston 32 at all times.

Part 24b of the cylinder 24 defines a second cylinder bore provided with an inlet 48 and outlet 49 bore containing a piston 50 having an integral piston rod 51. The lower or forward end of the second cylinder bore communicates with the first cylinder bore via passage 31, rearwardly of first piston 32. Second piston 50 is provided with ports 52 fitted with non-return or unidirectional flow valves 53 which control the flow of the secondary fluid between the front and back of the second piston. An "O" ring 54 is fitted to the piston 50 to prevent leakage and the piston rod 51 is surrounded by a steam seal 55. The piston rod 51 is actuated by a cam system, for example a rail on a rotary filler, which is so designed that the stroke of the piston can be varied and also so that one or more dwell periods can be arranged as required between the beginning and end of the desired stroke.

A shuttle valve 56 having an integral valve rod 57 a cylindrical wiping surface (FIG. 11), and a port or recess 58 in such surface reciprocates in bore of cylinder 59. The cutoff bore has an inlet 29 and a discharge nozzle 44 adjacent the downstream or outlet end 30 of the cutoff bore. The first cylinder bore is connected to the cutoff bore via port 26 between inlet 29 and outlet end 30. Inlet 29 is connected via a pipe to a source of primary fluid. A secondary fluid inlet port 60 is provided for a supply of sterile water from the cylinder 24b via its outlet port 49 and an interconnecting tube 61 to introduce the sterile water into the cutoff bore upstream of shuttle 56 and thereby maintain sterility behind the shuttle. The valve rod is surrounded by a steam seal 62 which seals the upper or upstream end of the cut off bore. Valve rod 57 is actuated by a cam system, for example a rail on a rotary filler, which is synchronised with the cam that actuates the piston rod 51. The shuttle valve is provided with an "O" ring 63 to give a seal between the primary liquid side of the shuttle valve and the sterile water upstream of the shuttle valve. The front face of the piston 32 is concave and its radius corresponds with the radius of the cylindrical surface (FIG. 11) on shuttle 56.

In an alternative embodiment shown in FIG. 12, a tube 64 fitted with a supply check valve 65 is provided for transport of the secondary fluid from the reservoir to the cut-off bore of cylinder 59 via an inlet port 66, and a tube 67 with a return check valve 68 is provided for the return of the secondary fluid to the reservoir from the cut-off cylinder via an outlet port 69.

In operation, beginning with the position shown in FIG. 5, at the commencement of the filling cycle with the shuttle 56 in the downstream position, the piston 50 moves upwards reducing the hydraulic pressure of the secondary fluid and also allows the non-return valves 53 to open. The positive pressure in the secondary fluid assists this action. The floating piston 32 is thus induced to move rearwardly and this movement is assisted by the pressure contribution from the primary fluid which enters the forward end of the first cylinder from the inlet 29 via the port or recess 58 of the shuttle 56. The movement may also be spring assisted. The secondary fluid behind the piston 32 can flow readily between the measuring cylinder 25 and the end cap 27 via holes 47 provided in the support flange 38 of the guide tube 37.

Figure 6:
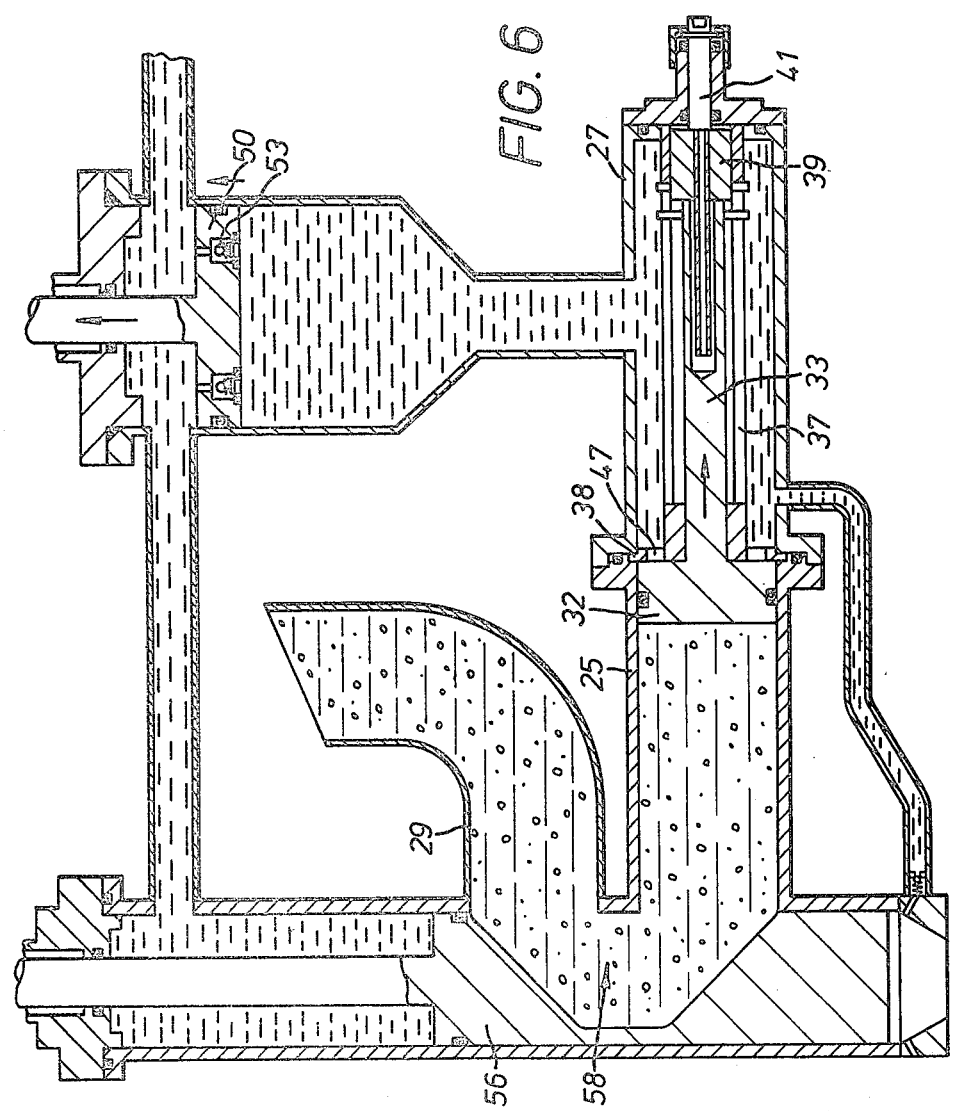
FIG. 6 is the same section as in FIG. 1 showing the components at the termination of the metering stroke.

The piston 32 is pushed back until the guide rod 33 reaches the back-stop bush 39 as shown in FIG. 6, and is held in this position provided that the pressure of the primary fluid is maintained above that of the secondary fluid.

Figure 7:
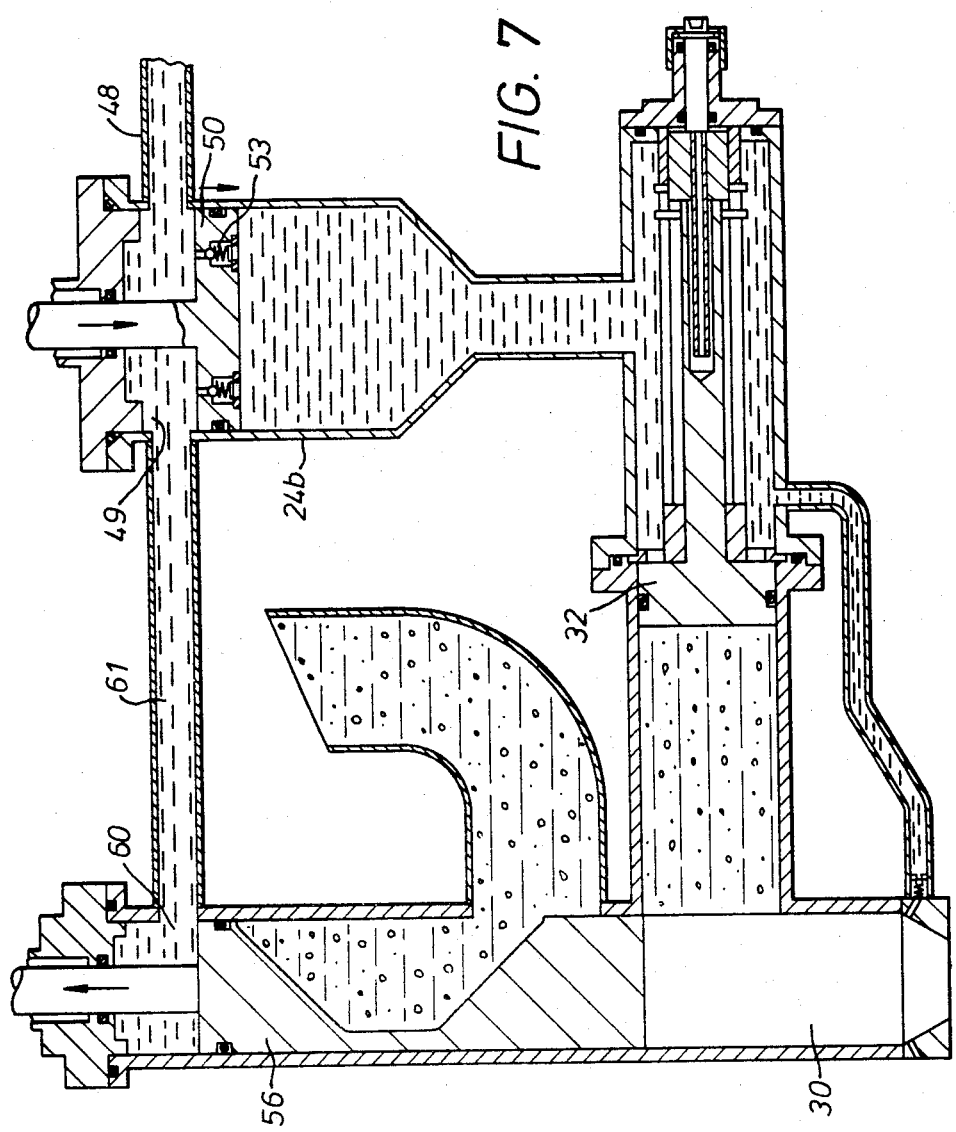
FIG. 7 is the same section as in FIG. 1 showing the components at the commencement of the discharge stroke.

The shuttle valve 56 then is moved to its upstream position to shut off the supply of primary fluid as shown in FIG. 7. The sterile water behind the shuttle valve is forced back through the inlet 60, the interconnecting tube 61 and the outlet 49 into the cylinder 24b above the rear face of the piston 50 and can flow back to the reservoir via inlet 48.

In the alternative embodiment shown in FIG. 12 there is a positive flow of secondary fluid so that the sterile water travels from the reservoir through the tube 64 fitted with a supply check valve 65 to enter the cutoff cylinder 59 via the inlet port 66 and when the shuttle 56 rises to shut off the supply of primary fluid, the sterile water is forced through the tube 67 fitted with the return check valve 68 via the outlet port 69 of the cutoff cylinder back to the reservoir. Thus, reciprocation of the shuttle pumps secondary fluid through the upstream end of the cutoff bore.

The piston 50 starts to descend immediately closing the non-return valves 53 thus forcing the secondary fluid into the first cylinder bore rearwardly of piston 32, so that the fluid transmits the motion of piston 50 to piston 32.

Figure 8:
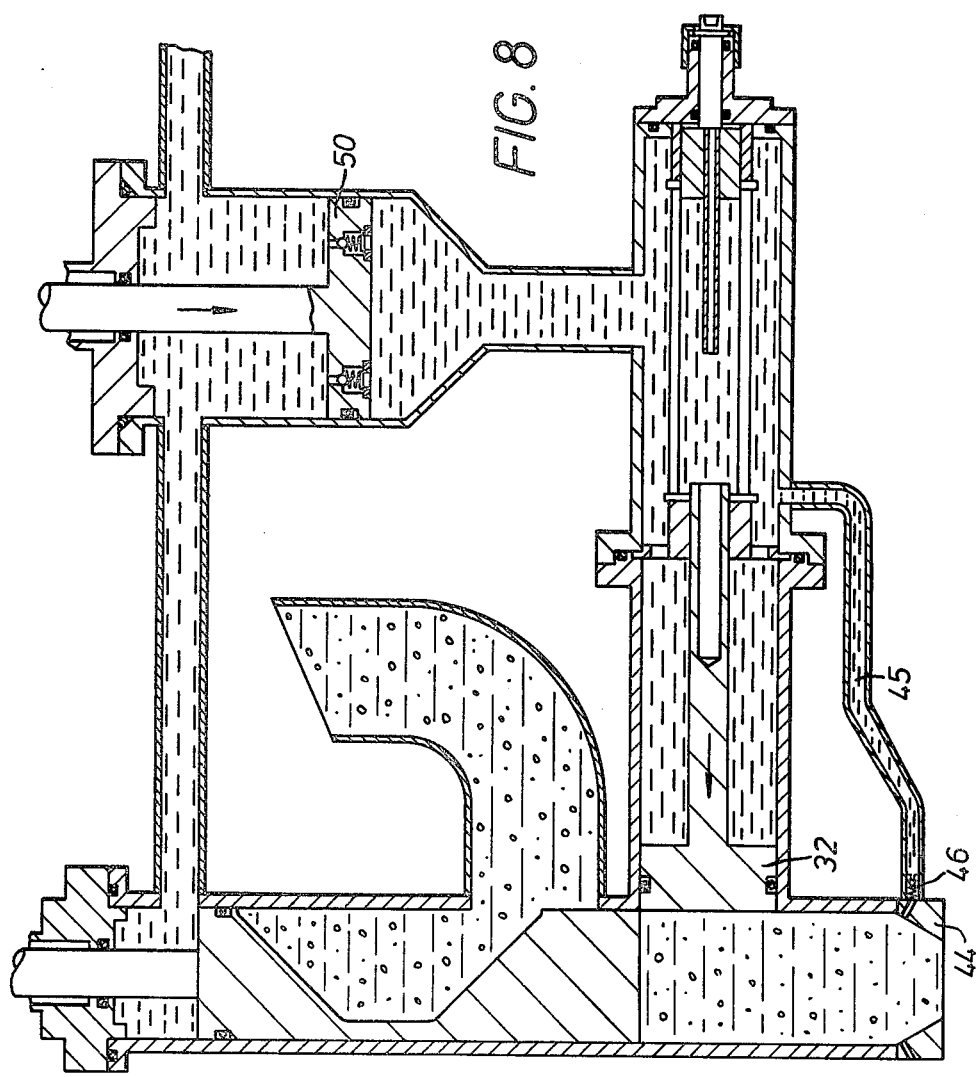
FIG. 8 is the same section as in FIG. 1 showing the components at the termination of the discharge of the primary fluid.

This piston 50 descends until the piston 32 reaches its forward stop position discharging the primary fluid as shown in FIG. 8. As illustrated in FIG. 8, the shuttle 56 remains in its upper or upstream position during this forward motion of piston 32. The displacement volume of the secondary fluid is equal to the displacement volume of the primary fluid and the set spring pressure in the non-return valve 46 is sufficient to prevent the secondary fluid from flowing into the discharge nozzle 44. The primary fluid flows through the discharge nozzle into a can (not shown).

Figure 9:
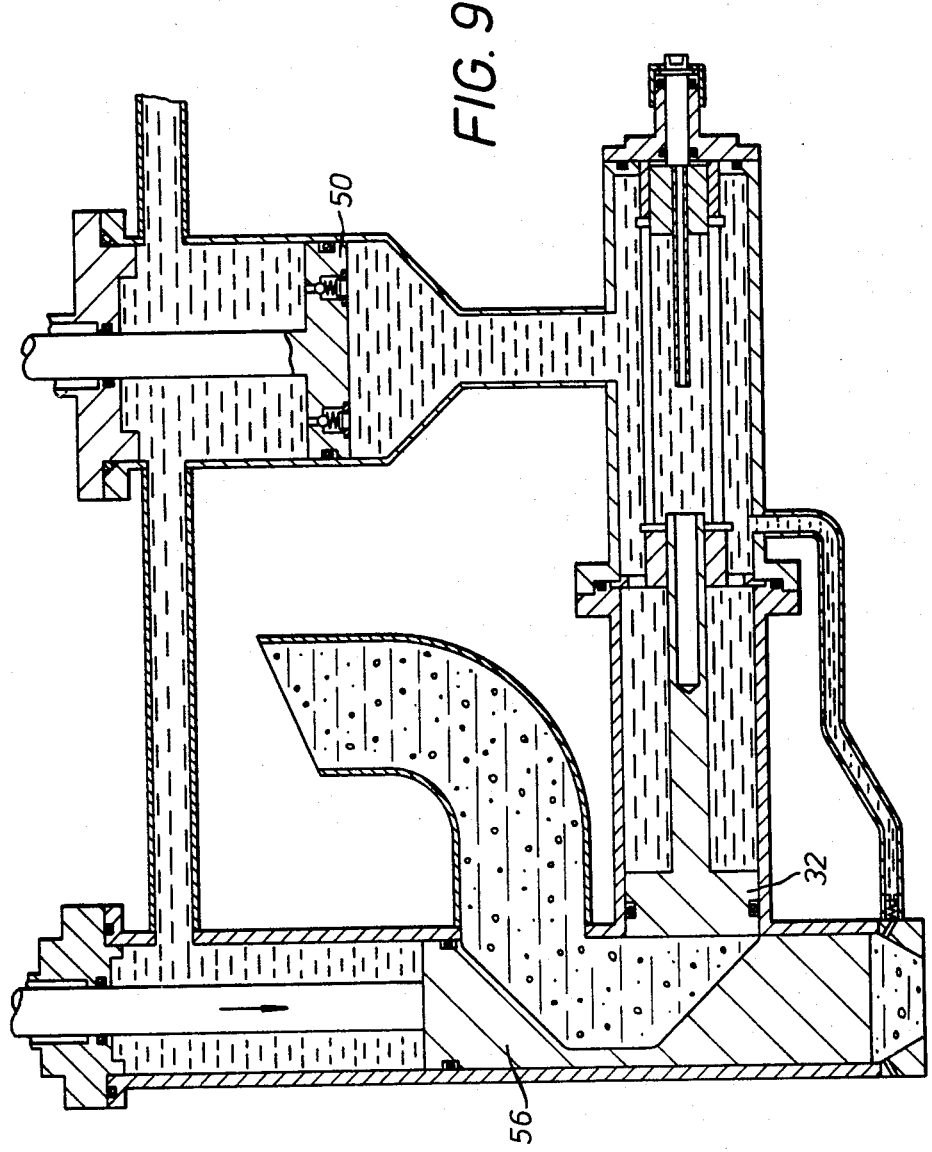
FIG. 9 is the same section as in FIG. 1 showing the components after the shuttle valve has descended.
Figure 10:
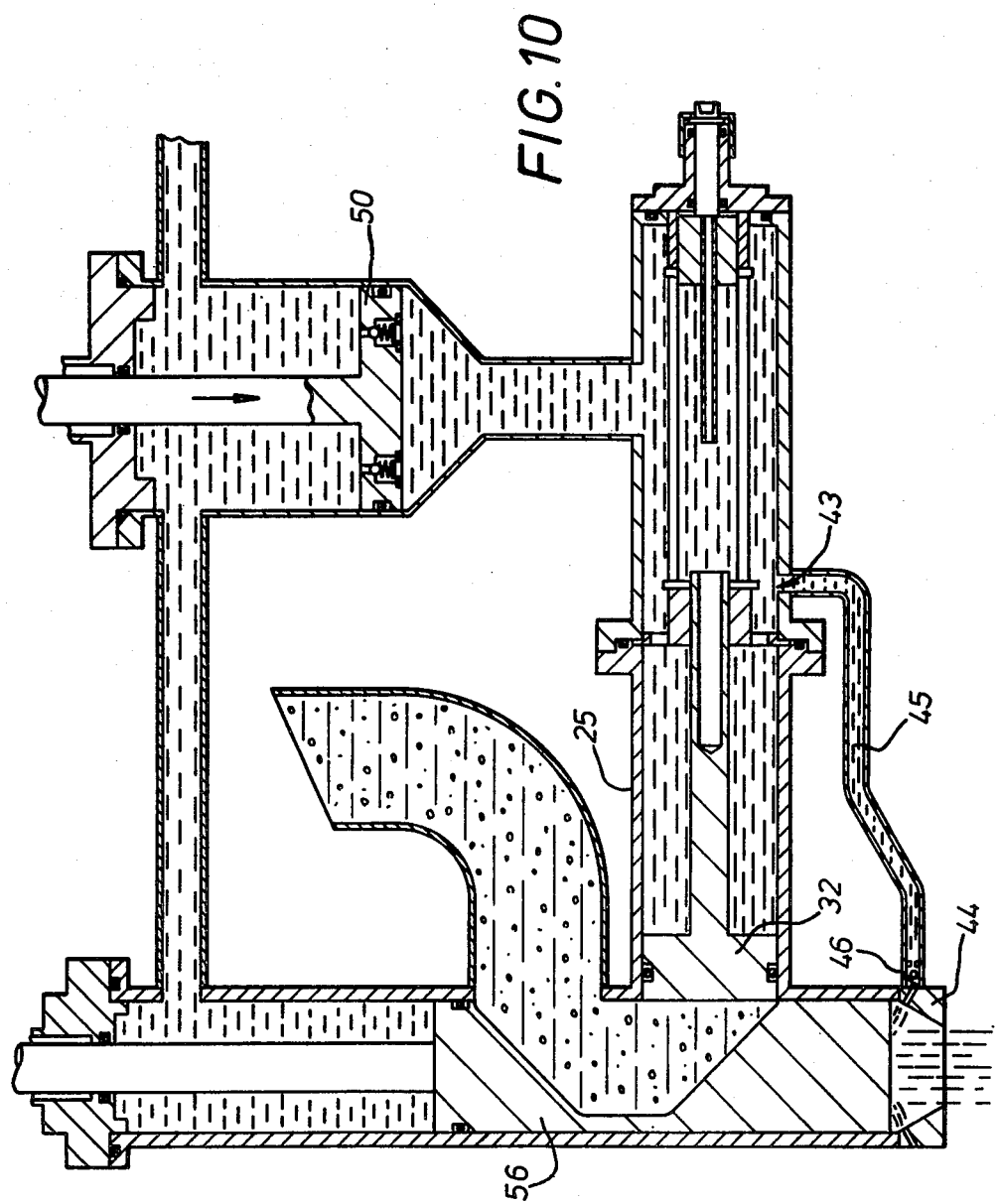
FIG. 10 is the same section as in FIG. 1 showing the components at the time of the discharge of the secondary fluid.
Figure 11:
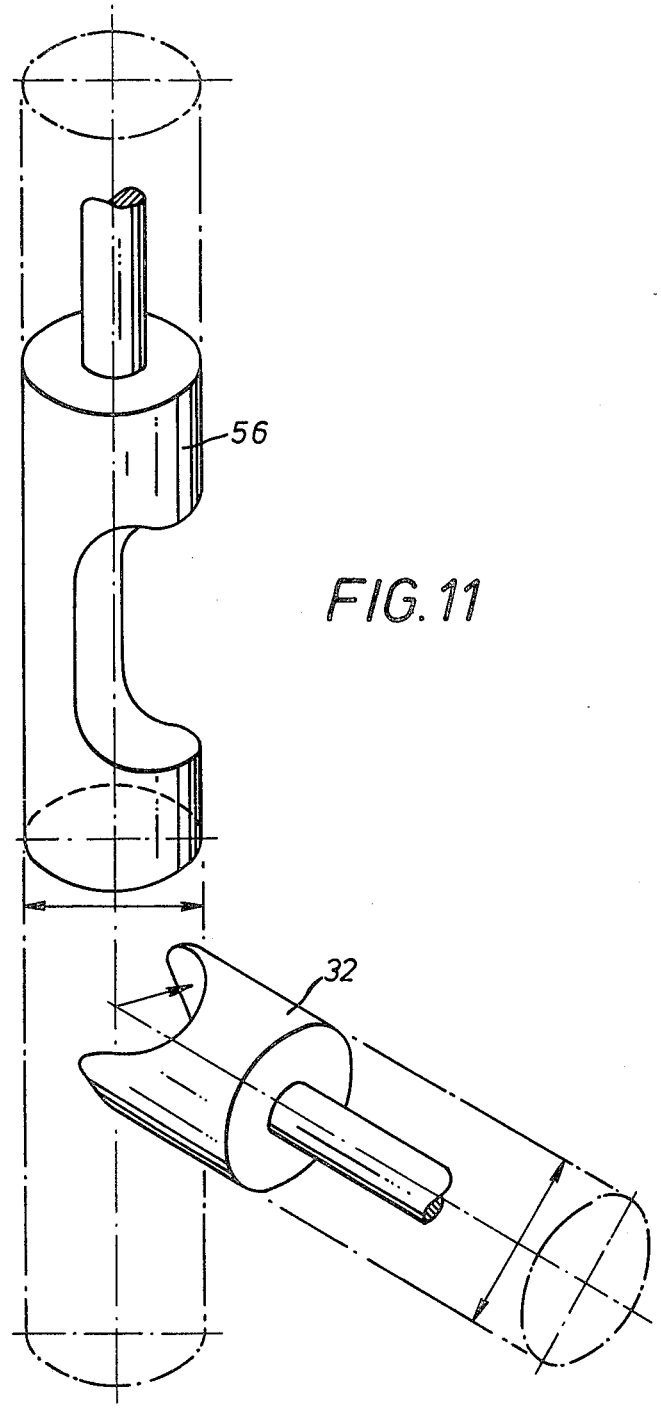

The shuttle 56 then descends to the downstream position wiping any remaining product from the concave front face of the piston 32 which is machined to have a radius corresponding with the radius of the shuttle surface as shown in FIG. 11. The efficiency of the wiping action is ensured by designing the pump so that the piston 32 cannot rotate by utilising the guide tube 37 with slots 36 and the pin 35. The speed of descent of the shuttle is sufficient to throw off any product adhering to the bottom. During the descent of the shuttle the space upstream of the shuttle is filled with sterile water which can flow from the sterile water reservoir via inlet 48, outlet 49, interconnecting tube 61 and inlet 60. The piston 50 remains in an intermediate stop position due to a dwell period on the cam and this position is shown in FIG. 9.

The piston 50 starts to descend again and since the piston 32 is at its forward stop position, the hydraulic pressure of the secondary fluid behind or rearwardly of the piston 32 increases and is communicated through the outlet 43 through the by-pass conduit 45 to the spring loaded normally closed pressure actuated valve 46 set to open at a predetermined pressure. When this predetermined pressure is attained the valve 46 opens and the secondary fluid flows out of the first cylinder bore, through outlet 43, conduit 45 and valve 46 into the void of the discharge nozzle 44 until the piston stops moving at the position shown in FIG. 10. The amount of secondary fluid injected into the discharge nozzle void 44 is related to the stroke length of the piston 50 which in turn is fixed by the ratio of secondary fluid to primary fluid required by the product specification. The injection of the secondary fluid into the void of the discharge nozzle (downstream of shuttle 56) washes away all traces of primary fluid from the downstream end of the shuttle valve 56 and from the internal surfaces of the discharge nozzle i.e., from the downstream portion of the cut off bore. The secondary fluid then mixes with the primary fluid which has previously been discharged from the measuring cylinder 25.

We claim:

1. A piston filler comprising:
   (a) means defining a first cylinder bore having a forward end and a rearward end;
   (b) means defining a cutoff bore having an upstream end, a downstream end, an outlet adjacent said downstream end and an inlet remote from said outlet, the forward end of said first cylinder bore intersecting said cutoff bore between said inlet and said outlet;
   (c) a first piston having a forward face and a rearward face, such piston being slidably sealingly mounted in said cylinder bore with the forward face of such piston facing toward the forward end of such bore, such piston being slidable between a forward position adjacent said cutoff bore and a rearward position remote from said cutoff bore;
   (d) a shuttle having a downstream end, an upstream end, a wiping surface between said ends and a recess in said wiping surface, said shuttle being slidably sealingly mounted in said cutoff bore, the downstream end of the shuttle facing toward the downstream end of the cutoff bore, said shuttle being movable between an upstream position in which the downstream end of the shuttle is upstream of said first cylinder bore and a downstream position in which the downstream end of the shuttle is downstream of said first cylinder bore and the recess extends between said inlet and said cylinder bore;
   (e) means for connecting said inlet to a source of a primary fluid;
   (f) cyclically operative reciprocation means for:
      (1) retracting said first piston rearwardly while retaining said shuttle in said downstream position, whereby the primary fluid will enter said cylinder bore via said inlet and the recess in the shuttle; then
      (2) moving said shuttle to said upstream position; then
      (3) advancing said piston to said forward position while retaining said shuttle in said upstream position to expel the primary fluid from the cylinder bore into the cutoff bore downstream of the shuttle; and
      (4) moving said shuttle from said upstream position to said downstream position while retaining said piston in said forward position, whereby the shuttle expels primary fluid from the cutoff bore through the outlet and the wiping surface of the shuttle engages and wipes the forward face of the first piston;
   (g) cutoff bore wash means for supplying a secondary fluid to said cutoff bore upstream of said
   (h) cylinder bore wash means for passing said secondary fluid into and out of said first cylinder bore rearwardly of said first piston; and
   (i) outlet wash means for introducing said secondary fluid into said cutoff bore downstream of said shuttle while said shuttle is adjacent said downstream position so that such fluid contacts the downstream end of the shuttle to thereby wash any residual primary fluid from the downstream portion of said cutoff bore and the downstream end of the shuttle.

2. A piston filler as claimed in claim 1 wherein said wiping surface of said shuttle is semi-cylindrical and the forward face of said first piston is concave, the radius of such concave forward face being equal to the radius of said wiping surface, the filler further comprising means for preventing rotation of said first piston thereby to maintain said concave forward face in alignment with said wiping surface.

3. A piston filler as claimed in claim 1 wherein said cutoff bore wash means includes means for sealing the upstream end of said cutoff bore, a supply check valve and a return check valve, said check valves communicating with said cutoff bore adjacent the upstream end thereof, said cutoff bore wash means also including means for connecting said supply check valve to a source of secondary fluid, said supply check valve being operative to permit flow into said cutoff bore and to block flow out of said cutoff bore, said return check valve being operative to permit flow out of said cutoff bore and to block flow into said cutoff bore, whereby reciprocation of said shuttle will pump secondary fluid through the upstream end of the cutoff bore.

4. A piston filler as claimed in claim 1 wherein said reciprocation means includes means for forcing secondary fluid under pressure into the said first cylinder bore rearwardly of said first piston thereby to advance said first piston towards said forward position and means for arresting forward motion of said piston at said forward position, said cylinder bore wash means including said secondary fluid forcing means.

5. A piston filler as claimed in claim 4 wherein said outlet wash means includes a bypass conduit interconnecting the rearward portion of said first cylinder bore and the downstream end of said cutoff bore, said outlet wash means also including a normally-closed pressure-actuated valve in said bypass conduit, said pressure-actuated valve being operative to open only when the pressure in the rearward portion of said first pump cylinder bore exceeds a predetermined pressure, said secondary fluid forcing means being operative to force said secondary fluid into said cylinder bore under a pressure in excess of said predetermined pressure while said first piston is at said forward position and thereby open said pressure-actuated valve.

6. A piston filler as claimed in claim 4 wherein said secondary fluid forcing means includes means defining a second cylinder bore having a rearward end and a forward end communicating with said first cylinder bore rearwardly of said first piston, such forcing means also including a second piston slidably sealingly mounted in said second cylinder bore, means for reciprocating said second piston and unidirectional flow means for admitting said secondary fluid to the portion of said second bore forward of said second piston.

7. A piston filler as claimed in claim 6 wherein said unidirectional flow means includes means for admitting the secondary fluid to said second cylinder bore rearwardly of said second piston, a port extending through said second piston and a unidirectional flow valve operative to permit flow through such port from the rear of said second piston to the front thereof but to block reverse flow through such port.

8. A piston filler comprising:
(a) means defining a cylinder bore having a forward end and a rearward end;
(b) means defining an inlet and an outlet;
(c) cyclically operative valve means for connecting the forward end of said bore alternately to said inlet and said outlet;
(d) means for connecting said inlet to a source of primary fluid;
(e) a first piston and a second piston, each of said pistons having a forward face and a rearward face, each of said pistons being slidably sealingly mounted in said bore, said first piston being disposed forwardly of said second piston whereby said pistons define a space therebetween, said first piston having a port extending between its faces;
(f) cyclically operative first piston reciprocation means coordinated with said valve means for moving said first piston rearwardly when said valve means connects the bore with the inlet and moving said first piston forwardly when said valve means connects the bore with the outlet whereby the first piston will draw the primary fluid into the bore via the inlet and expel it from the bore via the outlet;
(g) cyclically operative second piston reciprocation means for reciprocating the second piston in coordination with said first piston to alternately increase and decrease the volume of said space by a predetermined amount;
(h) a control valve communicating with said space and means for supplying a secondary fluid to said control valve, said control valve being operative to permit flow into said space but block flow out of said space; and
(i) port control means for closing the port in said first piston during an increase in the volume of said space and opening such port during a decrease in the volume of such space, whereby a predetermined amount of the secondary fluid will be drawn into the space between the pistons through the control valve and expelled through the port in the first piston, through the forward end of the bore and into the outlet on each cycle of the valve means and reciprocation means.

9. A piston filler as claimed in claim 8 wherein said port control means includes a normally closed pressure-actuated valve in said port, said first piston reciprocation means including means for biasing said first piston rearwardly and means for limiting the travel of said first piston, said second piston reciprocation means being operative to:
(1) move said second piston forwardly when the forward end of said bore is connected to said outlet, thereby pressurizing the secondary fluid in said space and forcing said first piston forwardly until such piston reaches its forwardmost position; then
(2) continue forward motion of said second piston, thereby forcing said pressure-actuated valve open and diminishing the volume of said space; then
(3) move said second piston rearwardly while said bore is connected to said inlet, thus depressurizing the secondary fluid in said space and permitting said biasing means to move said first piston rearwardly, and then
(4) continue rearward movement of said second piston after said first piston reaches its rearwardmost position, thereby increasing the volume of said space.

10. A piston filler as claimed in claim 8 in which said cylinder bore includes two portions disposed at right angles to one another, one of such portions defining the forward end of the bore and housing said first piston, the other of such portions defining the rearward end of the bore and housing said second piston.

11. A piston filler as claimed in claim 8 in which said control valve is a nonreturn valve mounted in said second piston.

12. A piston filler as claimed in claim 8 in which said second piston reciprocation means is operative to move said second piston rearwardly during rearward motion of said first piston and forwardly during forward motion of said first piston, and to move the second piston at speeds greater than the speeds of the first piston whereby the volume of said space decreases during forward motion of said first piston.

13. A piston filler as claimed in claim 12 in which said first piston reciprocation means includes a piston rod connected to said first piston and means for moving said piston rod forwardly and rearwardly, said port control means being operative to close said port responsive to rearward motion of said rod and open said port responsive to forward motion of said rod.

* * * * *

UNITED STATES PATENT AND TRADEMARK OFFICE
CERTIFICATE OF CORRECTION

PATENT NO. : 4,479,758
DATED : October 30, 1984
INVENTOR(S) : Hersom et al.

It is certified that error appears in the above—identified patent and that said Letters Patent is hereby corrected as shown below:

Col. 2, line 36, "be cam" should read --by cam--.
Col. 3, line 62, "fulid" should read --fluid--.
Col. 5, line 17, after "follows", delete the period and insert a colon.
Col. 6, line 8, after "follows", delete the period and insert a colon.
Col. 6, line 16, "rearward" should read --rearwardly,--.
Col. 7, line 12, "49 bore" should read --49, the second cylinder bore--.
Col. 7, line 30, "in bore" should read --in the cut-off bore--.
Col. 8, line 34, "This piston" should read --The piston--.
Col. 8, line 54, "shuttle" should read --shuttle 56--.
Claim 1, Col. 10, line 2 after "said" insert --shuttle;--.

Signed and Sealed this

Twenty-sixth Day of March 1985

[SEAL]

Attest:

DONALD J. QUIGG

*Attesting Officer*  *Acting Commissioner of Patents and Trademarks*

UNITED STATES PATENT AND TRADEMARK OFFICE
CERTIFICATE OF CORRECTION

PATENT NO. : 4,479,758
DATED : October 30, 1984
INVENTOR(S) : Albert C. Hersom, et al.

It is certified that error appears in the above-identified patent and that said Letters Patent is hereby corrected as shown below:

On the title page of the patent, in the "Notice:" section, the information should read --The portion of the term of this patent subsequent to October 25, 2000 has been disclaimed.--

Signed and Sealed this

Twenty-fourth Day of May, 1988

Attest:

DONALD J. QUIGG

Attesting Officer

Commissioner of Patents and Trademarks